US008352877B2

(12) United States Patent
Beatty et al.

(10) Patent No.: US 8,352,877 B2
(45) Date of Patent: Jan. 8, 2013

(54) ADJUSTMENT OF RANGE OF CONTENT DISPLAYED ON GRAPHICAL USER INTERFACE

(75) Inventors: Bryan Beatty, Sammamish, WA (US); Bogdan Popp, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 730 days.

(21) Appl. No.: 12/043,931

(22) Filed: Mar. 6, 2008

(65) Prior Publication Data

US 2009/0228828 A1 Sep. 10, 2009

(51) Int. Cl.
G06F 3/048 (2006.01)
(52) U.S. Cl. ........................................................ 715/786
(58) Field of Classification Search .................. 715/786; 345/158, 157, 174, 156, 173, 175, 179, 180, 345/183, 207, 165
See application file for complete search history.

(56) References Cited

U.S. PATENT DOCUMENTS

| | | | |
|---|---|---|---|
| 5,491,781 A | 2/1996 | Gasperina | |
| 5,838,320 A | 11/1998 | Matthews, III et al. | |
| 5,850,531 A | 12/1998 | Cox et al. | |
| 5,900,877 A | 5/1999 | Weiss et al. | |
| 6,204,846 B1 | 3/2001 | Little et al. | |
| 6,518,984 B1 | 2/2003 | Maeckel et al. | |
| 6,922,816 B1 | 7/2005 | Amin et al. | |
| 7,080,324 B1 * | 7/2006 | Nelson et al. | 715/771 |
| 7,765,491 B1 * | 7/2010 | Cotterill | 715/833 |
| 2005/0091604 A1 | 4/2005 | Davis | |
| 2006/0026535 A1 * | 2/2006 | Hotelling et al. | 715/863 |
| 2006/0026536 A1 * | 2/2006 | Hotelling et al. | 715/863 |
| 2006/0284852 A1 * | 12/2006 | Hofmeister et al. | 345/173 |
| 2007/0152984 A1 * | 7/2007 | Ording et al. | 345/173 |
| 2007/0279394 A1 * | 12/2007 | Lampell et al. | 345/173 |
| 2008/0122796 A1 * | 5/2008 | Jobs et al. | 345/173 |

OTHER PUBLICATIONS

Smith, et al., "Stretch Button Scrollbar", Conference companion on Human factors in computing systems: common ground, 1996, ACM, pp. 5.
Joseph et al., "Creating Your Own FlashHelp Skins (Part 2): Navigation Pane and About Box", Adobe Systems Incorporated, 2008, pp. 8.
"PS6: Toolkit Extension", 6.831 User Interface Design & Implementation, 2004, pp. 3.

* cited by examiner

*Primary Examiner* — Tuyetlien Tran
*Assistant Examiner* — Amy M Levy
(74) *Attorney, Agent, or Firm* — Alleman Hall McCoy Russell & Tuttle LLP

(57) ABSTRACT

Various embodiments related to the adjustment of a displayed range of a portion of a content selection are disclosed. In one embodiment, a computing device with an interactive display is configured to display a portion of a content selection and a control associated with the content selection. The control comprises a track and an indicator that indicates a location and a range of the portion of the content selection within the content selection as a whole. A first type of input associated with the control alters the range of the portion of the content selection displayed relative to the content selection as a whole and adjusts an appearance of the indicator, while a second type of touch input associated with the control alters a portion of the content selection displayed and moves the indicator on the track.

19 Claims, 4 Drawing Sheets

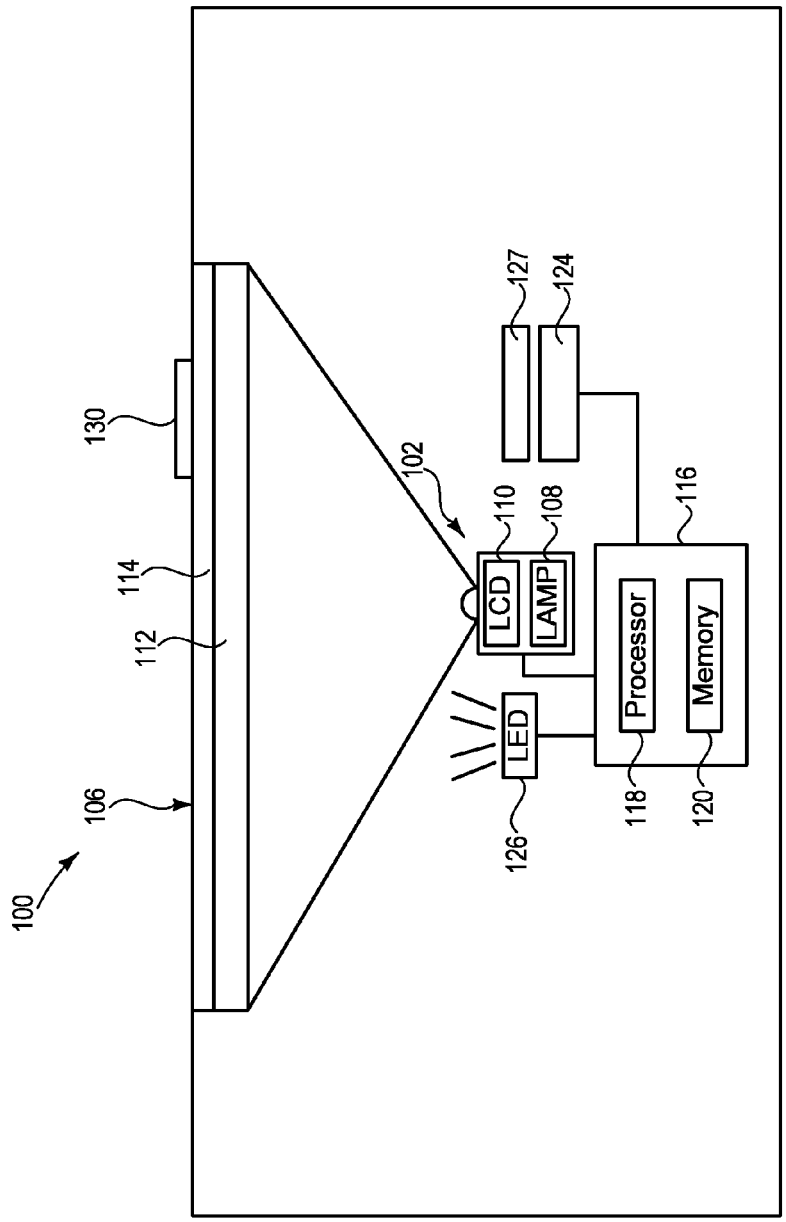
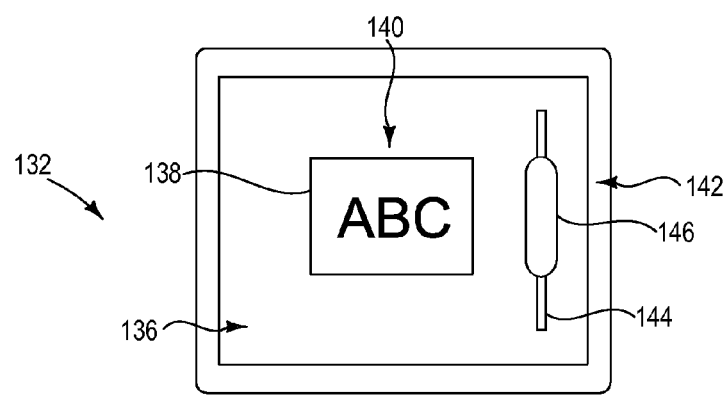
FIG. 1
FIG. 2

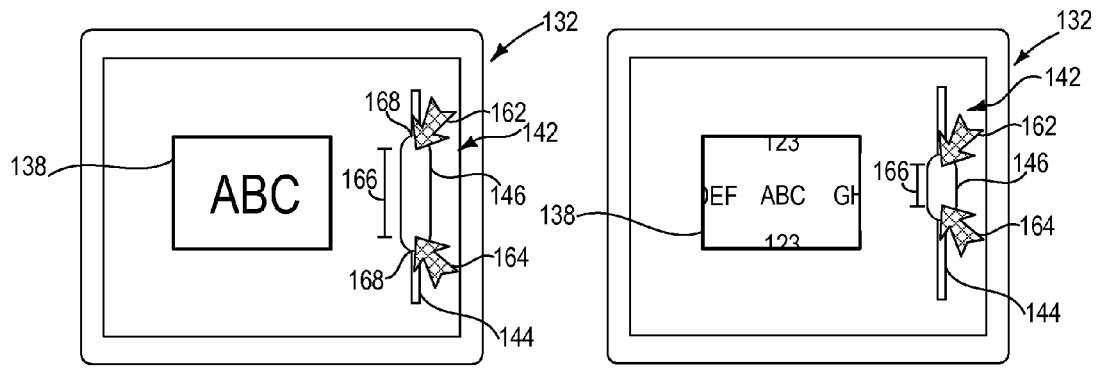
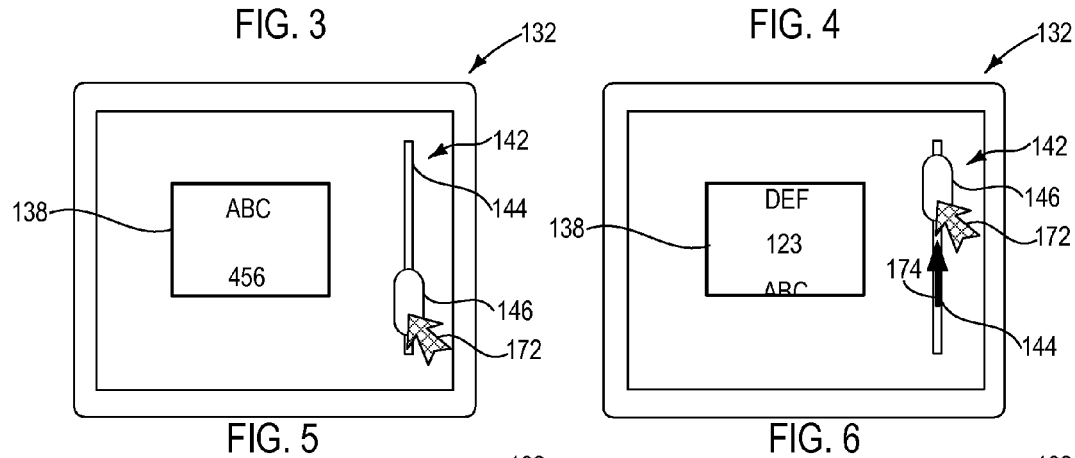
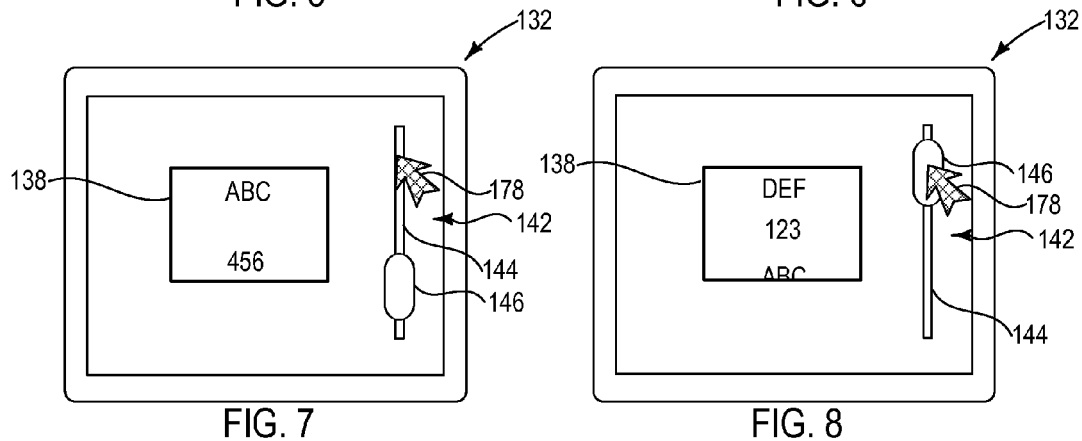
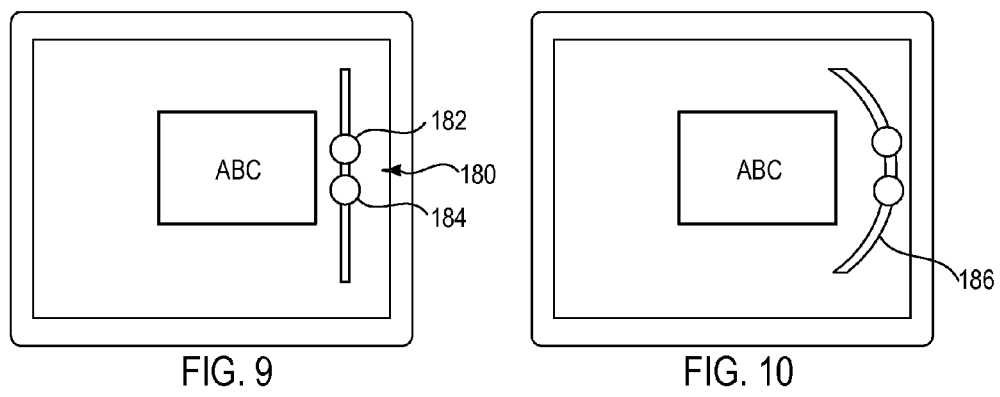

ADJUSTMENT OF RANGE OF CONTENT DISPLAYED ON GRAPHICAL USER INTERFACE

BACKGROUND

Computing devices may be configured to present a variety of content, such as text files, images, applications, folders, video, and other resources, to a user via a graphical user interface on a display. Some computing devices may include a touch-sensitive display that allows a user to control or manipulate the content presented on the display by touching the display in a location over, or otherwise associated with, the content.

Some content selections that are presented on a display may be too large to display in full at one time. Therefore, controls may be provided to allow the user to adjust the range and/or location of a portion of the content selection displayed on the screen. In a graphical user interface, a location of a displayed portion of a content selection relative to the selection as a whole may be adjusted, for example, by "dragging" a graphical scrolling indicator along a graphical scroll bar with a mouse, touch input, or the like, while a range of content displayed may be adjusted via a zoom control. Such operations are generally carried out by separate controls.

SUMMARY

Accordingly, various embodiments related to the adjustment of a displayed range of a portion of a content selection are disclosed herein. In one disclosed embodiment, a computing device with an interactive display comprises code executable to display a portion of a content selection on the display, and code executable to display a control associated with the content selection. The control comprises a track and an indicator configured to indicate a location and a range of the portion of the content selection within the content selection as a whole via a location of the indicator on the track and an appearance of the indicator. The computing device further comprises code executable to detect a first type of input associated with the control, and in response to alter the range of the portion of the content selection displayed relative to the content selection as a whole and to adjust an appearance of the indicator. Additionally, the computing device comprises code executable to detect a second type of input associated with the control, and in response to display a different portion of the content selection and to move the indicator on the track.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 shows an embodiment of a touch sensitive display device according to the present disclosure.

FIG. 2 shows an embodiment of a user interface displayed on a touch sensitive display device.

FIGS. 3-4 illustrate an example of a multi-touch operation being carried out on an embodiment of a touch sensitive display.

FIGS. 5-6 illustrate an example of a single touch operation being carried out on an embodiment of a touch sensitive display.

FIGS. 7-8 illustrate another example of a single touch operation being carried out on an embodiment of a touch sensitive display.

FIGS. 9-10 illustrate various embodiments of controls on touch sensitive displays.

DETAILED DESCRIPTION

Figure 11:
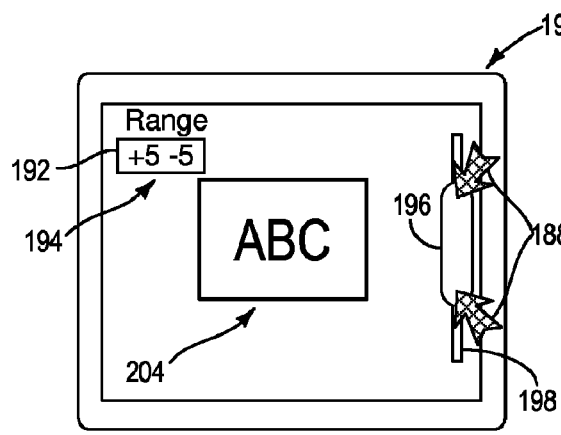
FIGS. 11-12 illustrates an example of a single touch operation being carried out on another embodiment of a touch sensitive display

Prior to discussing the multi-touch adjustment of a display range via a touch-sensitive input device, an embodiment of a suitable use environment is described. FIG. 1 shows a schematic depiction of an embodiment an interactive display device 100. The interactive display device 100 comprises a projection display system having an image source 102, and a display screen 106 onto which images are projected. While shown in the context of a projection display system, it will be appreciated that the embodiments described herein may also be implemented with other suitable display systems, including but not limited to LCD panel systems.

The image source 102 includes a light source 108 such as a lamp (depicted), an LED array, or other suitable light source. The image source 102 also includes an image-producing element 110 such as the depicted LCD (liquid crystal display), an LCOS (liquid crystal on silicon) display, a DLP (digital light processing) display, or any other suitable image-producing element.

The display screen 106 includes a clear, transparent portion 112, such as sheet of glass, and a diffuser screen layer 114 disposed on top of the clear, transparent portion 112. As depicted, the diffuser screen layer 114 acts as a touch surface. In other embodiments, an additional transparent layer (not shown) may be disposed over diffuser screen layer 114 as a touch surface to provide a smooth look and feel to the display surface. Further, in embodiments that utilize a LCD panel rather than a projection image source to display images on display screen 106, the diffuser screen layer 114 may be omitted.

Continuing with FIG. 1, the interactive display device 100 further includes an electronic controller 116 comprising memory 118 and a processor 120 configured to conduct one or more input aggregation operations, as described below. It will further be understood that memory 118 may comprise code stored thereon that is executable by the processor 120 to control the various parts of device 100 to effect the methods and processes described herein.

To sense objects placed on display screen 106, the interactive display device 100 includes an image sensor 124 configured to capture an image of the entire backside of display screen 106, and to provide the image to electronic controller 116 for the detection of objects appearing in the image. The diffuser screen layer 114 helps to avoid the imaging of objects that are not in contact with or positioned within a few millimeters of display screen 106, and therefore helps to ensure that only objects that are touching or in close proximity to display screen 106 are detected by image sensor 124. Because objects that are close to but not touching the display screen 106 may be detected by image sensor 124, it will be understood that the term "touch" as used herein also comprises near-touch inputs (i.e. proximity or "hover" inputs). Further, other embodiments may be configured to detect a proximity or hover input in a different manner than that described above.

The image sensor 124 may include any suitable image sensing mechanism. Examples of suitable image sensing mechanisms include but are not limited to CCD and CMOS image sensors. Further, the image sensing mechanisms may capture images of display screen 106 at a sufficient frequency to detect motion of an object across display screen 106. While the embodiment of FIG. 1 shows one image sensor, it will be appreciated that more than one image sensor may be used to capture images of display screen 106.

The image sensor 124 may be configured to detect light of any suitable wavelength, including but not limited to infrared and visible wavelengths. To assist in detecting objects placed on display screen 106, the image sensor 124 may further include an illuminant 126 such as one or more light emitting diodes (LEDs) configured to produce infrared or visible light to illuminate a backside of display screen 106. Light from illuminant 126 may be reflected by objects placed on display screen 106 and then detected by image sensor 124. Further, an infrared band pass filter 127 may be utilized to pass light of the frequency emitted by the illuminant 126 but prevent light at frequencies outside of the band pass frequencies from reaching the image sensor 124, thereby reducing the amount of ambient light that reaches the image sensor 124. While described herein in the context of an optical touch-sensitive system, the embodiments described herein also may be used with any other suitable type of touch-sensitive input system. Examples of other such systems include, but are not limited to, capacitive and resistive touch-sensitive inputs. Further, while depicted schematically as a single device that incorporates the various components described above into a single unit, it will be understood that the interactive display device 100 also may comprise more than one discrete physical parts or units connected as a system by cables, wireless connections, etc.

FIG. 1 also depicts a generic object 130 placed on display screen 106. Light from the illuminant 126 reflected by object 130 may be detected by image sensor 124, thereby allowing the object 130 to be detected on the screen. Object 130 represents any object that may be in contact with display screen 106, including but not limited to a finger, stylus, brush, or other manipulator.

FIG. 2 shows an embodiment of a user interface 132 that may be displayed on a touch-sensitive display 136. Before proceeding with the description of FIG. 2, it will be understood that the term "computing device" may include any device that electronically executes one or more programs, such as a user interface program, and may include personal computers, laptop computers, servers, portable media players, hand-held devices, cellular phones, and microprocessor-based programmable consumer electronic and/or appliances. The user interface 132 shown in FIG. 2 may be displayed on the interactive display device 100 of FIG. 1, or on any other suitable interactive display device.

The user interface 132 comprises a display window 138 in which a content selection 140 is displayed, and also a control 142 associated with content selection 140. The content selection 140 may comprise any suitable content, including but not limited to text, photographical images, photographs, icons, and/or video etc. The control 142 may be displayed on any portion of the screen that has touch sensitive capabilities, wherein the term "touch sensitive capabilities" may be defined as the ability to detect a touch input of a user. While shown in the context of an optical touch-sensing mechanism, it will be understood that any other suitable touch-sensing mechanism may be used, including but not limited to, capacitive and resistive touch-sensing mechanisms. Additionally, the display window 138 in which content selection 140 is displayed be displayed on any portion of touch sensitive display 136, whether that portion has or does not have touch sensitive capabilities. The control 142 may be displayed immediately adjacent to the display window 138, or may be displayed spaced from the display window 138. While only a single display window 138 and associated control 142 is depicted, it will be understood that multiple display windows and associated controls may be displayed at one time on a single display screen, thereby permitting the simultaneous manipulation of multiple multi-input controls by any number of users on a single device.

The control 142 comprises a track 144 and an indicator 146 configured to indicate a location and a range of a displayed portion of the content selection within content selection as a whole via a location of the indicator 146 on the track 144 and an appearance of indicator 146, respectively. In the depicted embodiment, the control has a unitary appearance in that it comprises only a single graphical element. In other embodiments, the indicator may comprise more than one individual location marker, as described in more detail below.

The user interface 132 is configured to distinguish different types of touches related to the control 142, and to adjust the portion of the content selection 140 displayed in the display window 138 according to the type of touch detected. For example, the user interface 132 may detect a first type of input, such as a multi-touch input, associated with the control 142, and in response to alter the range of the portion of the content selection 140 displayed relative to content selection 140 as a whole and to adjust the appearance of the indicator 146 in a corresponding manner. Likewise, the user interface 132 may detect a second type of input, such as a single touch input, associated with control 142, and in response may change the location of the portion of the content selection 140 displayed relative to the content selection as a whole. The term "associated with" as used herein refers to a touch, cursor or other graphical user interface input that is over or in such a proximity to the control 142 that a user would expect the control to respond to the input.

FIGS. 3 and 4 show an example of a first type of input in the form of a multi-touch input. While the depicted embodiments may be described in the context of a multi-touch device, it will be understood that the disclosed concepts may be used with any other suitable input device or devices than multi-touch devices. For example, in some embodiments, an interactive display device may be configured to accept input from two or more mice, trackballs, touch pads, joysticks etc., or combinations of a touch-screen input with such a device. Additionally, a touch pad such as a capacitive or resistive touch pad may be configured to detect multiple simultaneous touches, and to allow a user to manipulate a plurality of cursors on a display via a plurality of touches on a single touch pad. The term "cursor" may be used herein to represent any graphical depiction of a location of an input on a graphical user interface, including but not limited to arrows, pointers, shading, "indentations" in the graphics displayed on the graphical user interface, etc. It will be understood that the embodiments discussed below may be used with any suitable interactive display device with a user interface that can accept multiple simultaneous inputs to manipulate objects on the graphical user interface (i.e. "multi-input device").

Continuing with the figures, FIG. 3 shows a multi-input being initiated by a user by the user placing two fingers 162 and 164, cursors, or other manipulators (illustrated as arrows) over control 142 at different locations along the length of control 142. Next, FIG. 4 shows the user interface 132 after the multi-input has at least partially been performed. As can be seen, the multi-input comprises a gesture in which the user's fingers (or cursors, etc.) are moved closer in a direction along the track 144. In response, the user interface 132 adjusts the range of the displayed portion of the content selection 140 relative to the content selection as a whole, and also adjusts an appearance of indicator 146 in a manner corresponding to the magnitude of the change in distance between the two touches. As depicted, the adjustment in the appearance of the indicator 146 comprises a change in a length 166 of the indicator 146. However, any other suitable adjustment in appearance may be made.

In the depicted embodiment, the decrease in the length of the indicator is shown as corresponding to an outward zoom such that the displayed portion of the content selection has a lesser size but a greater total range. In other embodiments, a decrease in length of the indicator may correspond to an inward zoom such that the displayed portion of the content selection has a greater size but a lesser total range. Likewise, an increase in the length of the indicator may correspond either to an increase in size of the displayed content (i.e. zoom in), or an increase in the range of the content selection displayed (i.e. zoom out).

The use of a multi-input such as that illustrated in FIGS. 3-4 to effect the adjustment of a range-based control may allow a user of a multi-input device to easily learn and remember the range adjustment gesture. The user input gesture illustrated in FIGS. 3-4 has an intuitive nature in that the gesture causes a response with a direct "physical" connection to the gesture. For example, in the depicted example, the length 166 of the indicator 146 and the range of the content selection 140 displayed in the display window 138 are changed proportionately to the direction and magnitude of movement of fingers 162 and 164. This apparently "physical" link between the gesture and displayed result may therefore increase the ease of learning and using the user interface 132. As a more specific example, a user may make a "pinching" motion over the indicator 146 to cause the two ends of the indicator to "pinch" closer together. Likewise, a user can "spread" two fingers further apart over the indicator 146 to spread the ends of the indicator farther apart.

The user interface 132 may be configured to implement the gesture illustrated in FIGS. 3-4 in any suitable manner. For example, in one embodiment, upon detecting two inputs 162 and 164 over the indicator 146, the user interface 132 may be configured to detect a distance from each input 162, 164 to an end 168 of indicator 146 closest to that input, and then to treat these distances as fixed. Then, as the user performs the gesture, the user interface 132 may maintain a fixed distance between each input and the respective closest end 168 of indicator 146. As the user moves the inputs farther apart or closer together, the portion of the indicator 146 located between the inputs expands or contracts accordingly to cause the indicator 146 to change appearance. In this way the length 166 of the indicator may be adjusted in response to the multi-input.

Other embodiments may be configured to detect movement of more than two touches or other inputs, and to respond in a similar manner. For example, if a user places two fingers from one hand and one finger from another hand over the indicator and then moves the hands apart in a "stretching" manner, the user interface may be configured to detect an average location of all touches moving in a common direction along the track 144 or indicator 146, and then treat the average location of each group of common-direction touches as a single touch in the manner described above for the two-touch case. In yet another embodiment (not shown), the user interface 132 may be configured to detect a change in a distance between a touch input located over track 144 but spaced from indicator 146 and a touch input located over indicator 146 and, in response, adjust the range of the displayed portion of the content selection 140 in a manner related to a distance between the touches. It will be understood that these specific embodiments are described for the purpose of example, and are not intended to be limiting in any manner.

In addition to the first type of input, the user interface 132 may also be configured to detect a second type of input, and to take a different action in response to the second type of input compared to that taken in response to the first type of input. For example, the user interface 132 may be configured to detect a single touch or single cursor input associated with the control, and in response, to display a different portion of the content selection having the same range as the originally displayed portion, and to move the indicator on the track in a corresponding manner. An example of such a touch input is shown via arrow 172 in FIGS. 5-6. As depicted, such a touch input may be located over the indicator 146 and may move in a direction 174 along track 144 to cause the user interface 132 to scroll a different portion of the content selection into view.

In the depicted embodiment, motion of the indicator in one direction (e.g. down) causes the displayed portion of the content selection to scroll in an opposite direction (e.g. up) on the display. However, in other embodiments, motion of the indictor in one direction (e.g. down) may cause the displayed portion of the content selection to scroll in the same direction. In either case, because the adjustments are made via the same control as the multi-touch range adjustment input, separate controls for adjusting the range and the location of the displayed portion of a content selection may be omitted, thereby simplifying the user interface and allowing the use of a greater amount of space for content display.

Another example of a single input operation that may be performed is shown in FIGS. 7 and 8. First, FIG. 7 shows a single touch or single cursor input (illustrated as an arrow 178) located over the track 144 and spaced from the indicator 146. Next, FIG. 8 shows the user interface 132 after the single touch or cursor input has progressed. As depicted, in response to the single touch input, the user interface 132 adjusts the position, but not the size, of the indicator 146 on the track 144 and scrolls the content selection to bring a different portion of the content selection into view. Note that the single touch or cursor input shown via arrow 178 in FIGS. 7 and 8 is stationary and does not move in a direction along the track as depicted in FIGS. 5 and 6.

In some embodiments, the indicator 146 may have a unitary appearance, as shown in FIG. 2-8. In other words, the indicator comprises a single geometric shape disposed along the track. However, in other embodiments, such as that shown in FIG. 9, an indicator 180 may comprise two or more markers located along an indicator track. For example, FIG. 9 shows an indicator 180 that may include a first marker 182 that defines a first end of the indicator 180 and a second marker 184 that defines a second end of the indicator 180. In such an embodiment, the first type of input (e.g. a multi-touch or multi-cursor input) and the second type of input (e.g. a single-touch or single-cursor input), shown in FIGS. 5-8 may be carried out in a corresponding manner in the embodiment illustrated in FIG. 9. For example, a multi-input may cause the markers 182, 184 to move closer together or farther apart, while a single input may cause the markers to move along the indicator track in parallel. In yet other embodiments, an indicator that initially has a unitary appearance may "pull apart" into two separate markers when a user makes a "stretch" or other similar input. In such an embodiment, the indicator may "recombine" into a unitary marker when the markers are "pinched" together by a user via a suitable multi-input.

Additionally, the indicator of FIG. 9 may also be adjusted by other first and second types of inputs. For example, the range of the indicator of FIG. 9 may be adjusted by a first type of input in the form of a touch or cursor input over one of the markers 182, 184. For example, the range may be decreased by moving one marker toward the other marker via an appropriate movement of a touch or cursor input over the marker to be moved. On the other hand, the location may be adjusted by touching (or positioning a cursor on) the track between the two indicators and then moving the touch or cursor in the desired direction. It will be understood that these are merely examples of first and second types of inputs associated with the control of the embodiment of FIG. 9, and that any other suitable first and second types of inputs may be used.

In some embodiments, a control track may be linear (i.e. not curved), as shown in FIGS. 2-9. In other embodiments, a control track a track 186 may be free form, curved, angled, or any combination thereof in an open shape, closed circle or other closed shape, etc. An example of an embodiment of a curved control track is shown at 186 in FIG. 10.

In some embodiments, a user interface may be configured to detect the first and second types of touches simultaneously. For example, in one embodiment, a user interface may be configured to detect a first type of touch input where two (or more) touches over a control indicator are moved toward or away from each other, and a second type of touch input where an average location of the first and second touches moves during such a user input gesture. Thus, the range and location of the portion of the content selection displayed may be changed via a single gesture. In other embodiments, a user interface may be configured to detect only a first type of touch when multiple touches over the indicator (or other defined portion of the control) are detected. In these embodiments, the user interface may change only one of the range and the location of the portion of the content selection displayed, depending upon the type of input detected.

Figure 12:
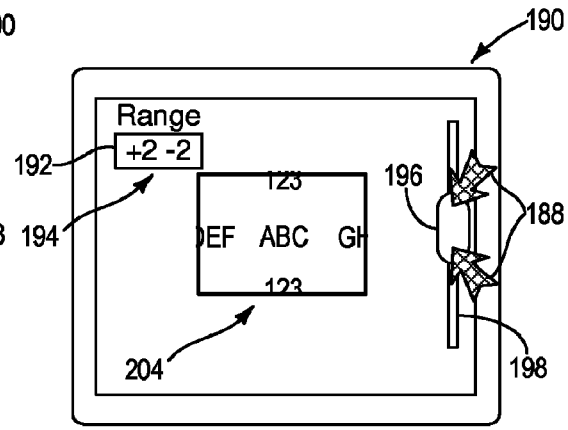

In yet other embodiments, the user interface may represent a change in a location of a control indicator in other manners besides, or in addition to, moving the location of the control indicator on the track. For example, referring to FIG. 11, a numerical representation of the range (not shown) and/or location (shown in FIG. 11) of the portion of the content selection may be displayed, and may be adjusted upon receiving a suitable touch input. FIGS. 11 and 12 show an example of such a user interface. First, FIG. 11 shows initiation of a multi-touch input 188 on a user interface 190 that displays a text box 192 containing a numerical representation 194 of the location of the indicator 196 on the track 198. Next, FIG. 12 shows user interface 190 after the multi-touch input 188 has progressed. As illustrated in the Figure, in response to the multi-touch input 188, the numerical representation 194 of the indicator location and a location of the displayed portion of a content selection 204 relative to the content selection as a whole are both adjusted.

Figure 13:
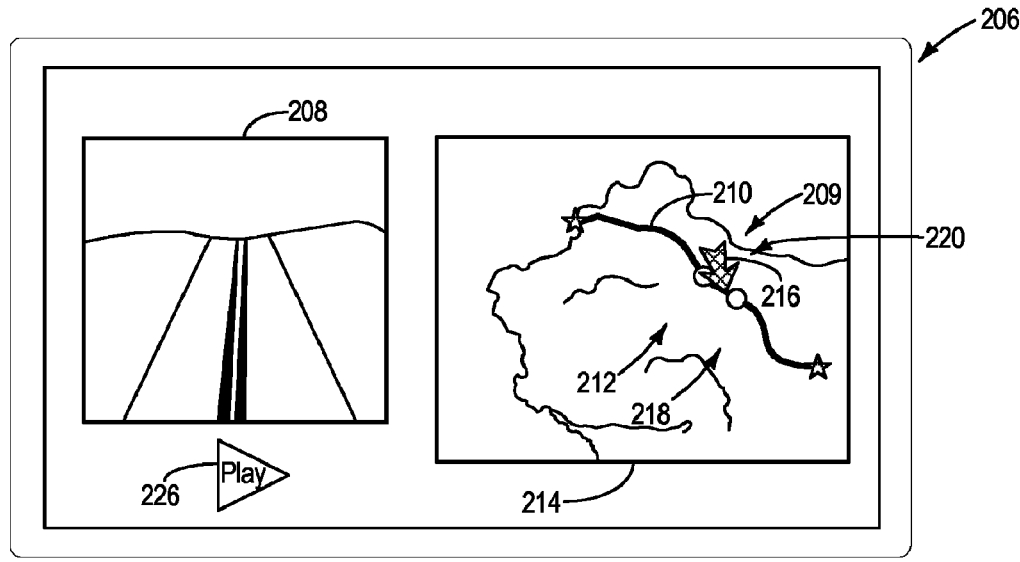
FIGS. 13-14 illustrate an example of a single touch operation being carried out on another embodiment of a touch sensitive display.
Figure 14:
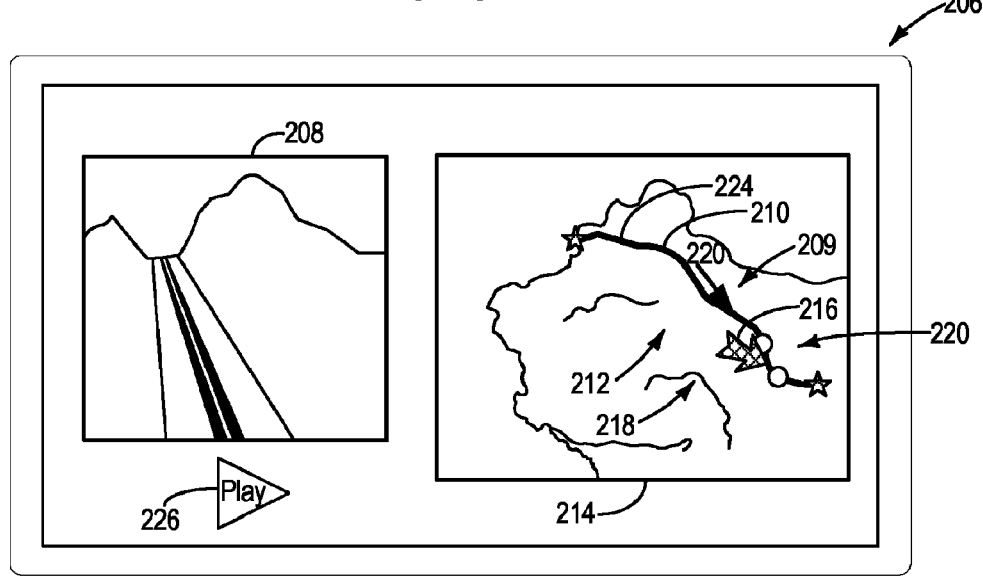

The embodiments of FIGS. 1-12 show a content selection in the form of text or stationary graphics. In other embodiments, the display of other types of content may be adjusted as described above. For example, some embodiment, the display of digital media, such as video data, audio data, or other suitable media, may be controlled in the manner described above. FIGS. 13 and 14 illustrate an embodiment in which the display of a video content selection is adjusted. As depicted in these Figures, a user interface 206 displays a video window 208 and a control window 209 that comprises a non-linear track 210 arranged along a geographical map. The non-linear track 210 may illustrate, for example, a geographic scope of a video selection that illustrates the view along roads represented by the depicted travel path. In this embodiment, a duration and location of the video may be selected for playback by adjusting an indicator in the manner described above.

First, FIG. 13 shows a single touch input initiated by the user by the user placing a finger 216 (illustrated as arrows) over an indicator 220 on a control 218. The user may move the indicator in a direction along an indicator track 224 to select a different portion of the video for display, as indicated in FIG. 14. Likewise, the length of the portion of the video selection viewed may be adjusted by utilizing a multi-touch input to move each end of the indicator 220 relative to the other end of the indicator. Once a video segment of a desired location and duration has been selected, a user may begin playback by touching the touch-sensitive display at button 226. Playback of an audio selection or an audio/video selection may be controlled in a similar manner.

Figure 15:
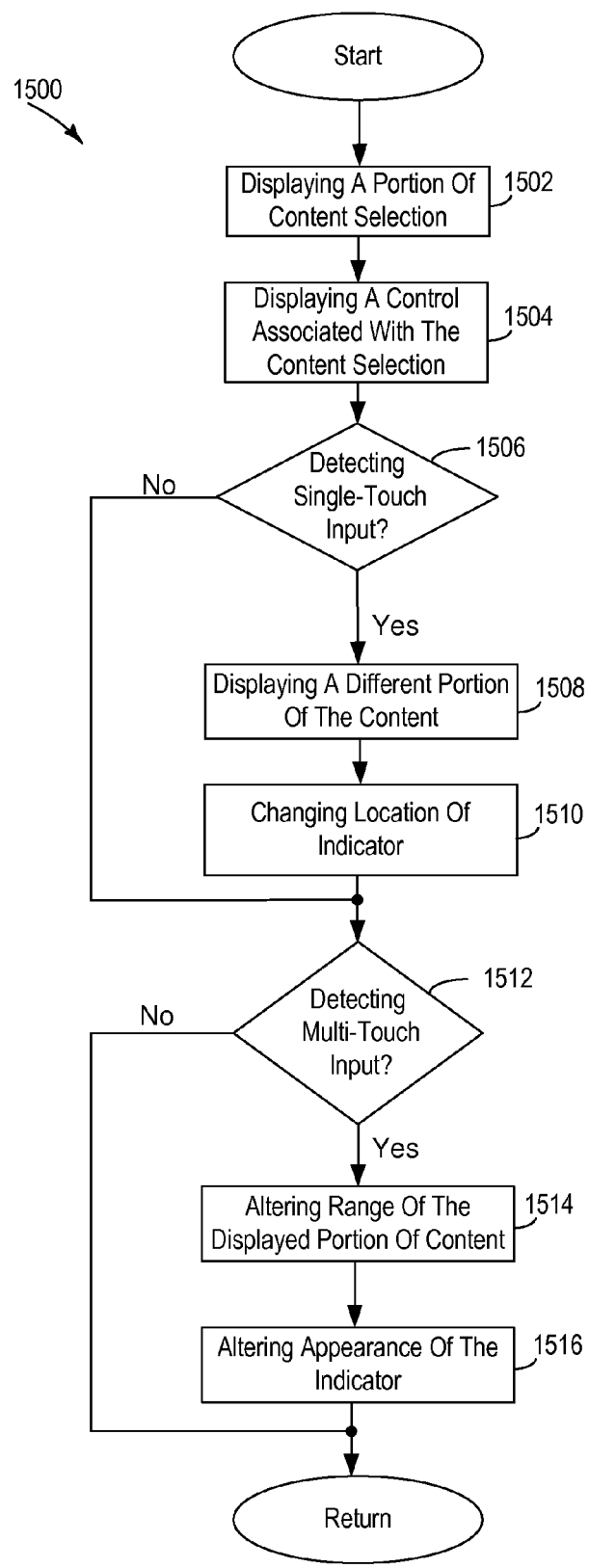
FIG. 15 shows a process flow depicting a method of detecting and responding to multiple types of touch inputs on a touch sensitive display.

FIG. 15 shows an embodiment of a method 1500 for detecting multiple types of inputs on a touch sensitive display. Method 1500 first comprises, at 1502, displaying a portion of the content selection on the display, and, at 1504, displaying a control a control associated with the content selection. The control may comprise a track and an indicator configured to indicate a location and a range of the portion of the content selection within the content selection as a whole via a location of the indicator on the track and appearance of the indicator, respectively.

Method 1500 next comprises, at 1506, detecting a single input associated with the control. In one example detecting a single input may include detecting a movement of a single touch along a portion of the track. If a single input is detected, method 1500 comprises, at 1508, displaying a different portion of the content selection and at 1510, and changing a location of the indicator on the track, in response to the single input.

Continuing with FIG. 15, method 1500 includes, at 1512, detecting a multi-input associated with the control, the multi-input comprising a change in distance between two or more inputs.

Upon detecting a multi-input, method 1500 comprises, at 1514, altering the range of the portion of the content selection displayed, and at 1516, altering an appearance of the indicator in response to the multi-input. In various embodiments, altering an appearance of the indicator may comprise detecting a distance between an outer edge of the indicator and an adjacent input over the indicator, and maintaining the distance between the outer edge of the indicator and the adjacent input over the indicator as the adjacent input is moved. In this manner, the indicator to a user may appear to lengthen or shorten in response to the input, depending upon the nature of the input.

The single- and multi-inputs may be detected in any suitable manner. For example, in some embodiments, the single- and multi-inputs are touch inputs that are detected optically. In other embodiments, the touch inputs may be detected via capacitance, resistance, or any other suitable multi-touch sensing mechanism. In yet other embodiments, the inputs are made via a plurality of mice, track balls, track pads, laser pointers, or via any other suitable input device.

While described in the context of an interactive display device, it will be understood that the embodiments disclosed herein may be used in any other suitable device with a graphical user interface. Additionally, it will be understood that the embodiments of user interfaces depicted herein are shown for the purpose of example, and that other embodiments are not so limited. Furthermore, the specific routines or methods described herein may represent one or more of any number of processing strategies such as event-driven, interrupt-driven, multi-tasking, multi-threading, and the like. As such, various acts illustrated may be performed in the sequence illustrated, in parallel, or in some cases omitted. Likewise, the order of any of the above-described processes is not necessarily required to achieve the features and/or results of the exemplary embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A computing device having an interactive display, the computing device comprising:
   code executable to display a portion of a video selection on the display;
   code executable to display a range adjustment control associated with the video selection, the range adjustment control comprising:
      a track arranged along a geographical map, and
      an indicator movable along the track and indicating a location and a playback length of the portion of the video selection within the video selection as a whole via a location of the indicator on the track and an appearance of the indicator, respectively;
   code executable to detect a first type of input executed over the range adjustment control, and in response to alter the playback length of the portion of the video selection displayed relative to the video selection as a whole and to adjust the appearance of the indicator; and
   code executable to detect a second type of input executed over the range adjustment control, and in response to display a different portion of the video selection and to move the indicator on the track to represent a location of the different portion.

2. The computing device of claim 1, wherein the first type of input comprises a multi-touch input.

3. The computing device of claim 2, further comprising code executable to detect a change in a distance between two touch inputs, and to change a length of the indicator and a length of the portion of the video selection displayed a corresponding amount.

4. The computing device of claim 3, wherein the code is executable to detect a change in a distance between two touch inputs located over the indicator.

5. The computing device of claim 4 wherein the code is executable to detect a change in a distance between a touch input located over the track spaced from the indicator and a touch input located over the indicator.

6. The computing device of claim 1, wherein the second type of input comprises a single touch located over the indicator and moving in a direction along the track.

7. The computing device of claim 1, further comprising code executable to display a text box containing a numerical representation of the location of the indicator on the track and, in response to the first type of input and/or the second type of input, to change the numerical representation.

8. The computing device of claim 1 wherein the indicator comprises a first marker defining a first end of the indicator and a second marker defining a second end of the indicator.

9. The computing device of claim 1, wherein the video selection includes audio content.

10. The computing device of claim 1 wherein the first type of input comprises multiple cursor inputs, and wherein the second type of input comprises a single cursor input.

11. A computing device having a touch sensitive display, the computing device comprising:
   code executable to display a portion of a video selection on the display;
   code executable to display a range adjustment control associated with the video selection in a region of the display, the range adjustment control comprising:
      a non-linear track arranged along a geographical map, and
      an indicator indicating a location and a playback length of the portion of the video selection within the video selection as a whole via a location of the indicator on the track and an appearance of the indicator, respectively;
   code executable to detect a multi-touch input comprising two touches located over the indicator, and in response to alter the playback length of the portion of the video selection displayed and to adjust a length of the indicator correspondingly; and
   code executable to detect a single touch input over the range adjustment control and in response to display a different portion of the video selection and to move the indicator on the track.

12. The computing device of claim 11, wherein the video selection comprises audio content.

13. The computing device of claim 11, wherein the track is linear, free form, curved, angled, or any combination thereof, and comprises an open shape or a closed shape.

14. The computing device of claim 11, wherein the multi-touch input comprises two touches located over the indicator, with one or more of the touches moving in a direction along the track.

15. The computing device of claim 11, wherein the single touch input comprises a single touch located over the indicator and moving in a direction along the track.

16. The computing device of claim 11, wherein the single touch input comprises a touch located over the track and spaced from the indicator.

17. A method for controlling a computing device having a touch sensitive display, the method comprising:
   displaying a portion of a video selection on the display;
   displaying a range adjustment control associated with the video selection, the range adjustment control comprising a non-linear track arranged along a geographical map and an indicator configured to indicate a location and a playback length of the portion of the video selection within the video selection as a whole via a location of the indicator on the track and an appearance of the indicator, respectively;
   detecting a single touch input executed over the range adjustment control;
   displaying a different portion of the video selection and changing a location of the indicator on the track in response to the single touch input;

detecting a multi-touch input executed over the range adjustment control, the multi-touch input comprising a change of a distance between two or more touch inputs; and altering the playback length of the portion of the video selection displayed and altering an appearance of the indicator in response to the multi-touch input.

18. The method according to claim 17, wherein altering the appearance of the indicator includes altering a size and/or a shape of the indicator.

19. The method according to claim 18, further comprising detecting a distance between an outer edge of the indicator and an adjacent touch input over the indicator, and maintaining the distance between the outer edge of the indicator and the adjacent touch input over the indicator as the adjacent touch input is moved.

* * * * *